(12) United States Patent
Hamada et al.

(10) Patent No.: US 8,523,449 B2
(45) Date of Patent: Sep. 3, 2013

(54) ROLLING BEARING

(75) Inventors: Kazuki Hamada, Kashiwara (JP);
Hiroshi Ueno, Tondabayashi (JP); Isao Usuki, Yamatotakada (JP)

(73) Assignee: Jtekt Corporation, Osaka-Shi (JP)

( * ) Notice: Subject to any disclaimer, the term of this patent is extended or adjusted under 35 U.S.C. 154(b) by 222 days.

(21) Appl. No.: 13/102,655

(22) Filed: May 6, 2011

(65) Prior Publication Data

US 2011/0280510 A1    Nov. 17, 2011

(30) Foreign Application Priority Data

May 12, 2010  (JP) ................................ 2010-110415

(51) Int. Cl.
*F16C 33/38* (2006.01)
*F16C 19/00* (2006.01)
*F16C 33/76* (2006.01)
*F16C 33/58* (2006.01)

(52) U.S. Cl.
USPC ............ 384/523; 384/470; 384/477; 384/513

(58) Field of Classification Search
USPC ................. 384/462, 463, 469, 470, 477, 478, 384/513, 515, 523, 527, 528, 530, 614, 623; 277/353, 551
See application file for complete search history.

(56) References Cited

U.S. PATENT DOCUMENTS

| | | | |
|---|---|---|---|
| 3,161,448 A | | 12/1964 | Moran |
| 3,642,335 A | * | 2/1972 | Takahashi et al. ............ 384/482 |
| 3,913,992 A | | 10/1975 | Scott et al. |
| 5,385,352 A | * | 1/1995 | Kurose .......................... 277/551 |
| 8,182,155 B2 | * | 5/2012 | Egami et al. ................... 384/490 |
| 2010/0061673 A1 | * | 3/2010 | Iguchi ........................... 384/523 |

FOREIGN PATENT DOCUMENTS

| | | |
|---|---|---|
| AT | 265762 B | 10/1968 |
| JP | U-62-162420 | 10/1987 |
| JP | A 2004-084782 | 3/2004 |
| JP | A 2006-329218 | 12/2006 |
| JP | A-2008-157441 | 7/2008 |

OTHER PUBLICATIONS

Apr. 15, 2013 Search Report issued in European Patent Application No. 11165627.8.

* cited by examiner

*Primary Examiner* — Thomas R Hannon
*Assistant Examiner* — Adam D Rogers
(74) *Attorney, Agent, or Firm* — Oliff & Berridge, PLC

(57) ABSTRACT

A rolling bearing includes: an inner ring; an outer ring; a plurality of rolling elements; a retainer; and a sealing member. First to third lubricant reservoir portions that store the lubricant are respectively formed on the radially inner side of the retainer, on the inner side of the sealing member, and in an inner peripheral surface of the outer ring at a position near a raceway. An inclined first guide surface that guides the lubricant from the second lubricant reservoir portion toward the raceway is formed in an inner surface of the sealing member. An inclined second guide surface contiguous with the first guide surface and guiding the lubricant toward the raceway is formed in the inner peripheral surface of the outer ring. The first lubricant reservoir portion of the retainer is in communication with pockets of the retainer, which accommodate the rolling elements.

12 Claims, 3 Drawing Sheets

ROLLING BEARING

INCORPORATION BY REFERENCE

The disclosure of Japanese Patent Application No. 2010-110415 filed on May 12, 2010 including the specification, drawings and abstract, is incorporated herein by reference in its entirety.

BACKGROUND OF THE INVENTION

1. Field of the Invention

The invention relates to a rolling bearing. More particularly, the invention relates to a rolling bearing that is used with grease lubrication under high speed of rotation.

2. Description of Related Art

Conventionally, a rolling bearing that is used in a machine, such as a turbo-molecular pump, which rotates at a high speed is generally lubricated with oil or oil mist. However, in recent years, grease is used as a lubricant because grease is easy to handle. In a case where grease is used as a lubricant, seal rings (sealing members) made of steel plates are arranged at end surface portions on the right and left sides of an annular space formed between an inner ring and an outer ring. Thus, outside leakage of the grease sealed inside the bearing is prevented.

However, when a rolling bearing having a conventional structure is used with grease lubrication under high speed of rotation, the grease sealed inside the bearing splashes to, for example, inner surfaces of seal rings due to centrifugal force in a relatively early stage. As a result, it becomes difficult to supply the lubricating oil content to raceways (at which rolling elements contact the inner peripheral surface of an outer ring and the outer peripheral surface of an inner ring, and which needs to be lubricated with a lubricant). Thus, vibrations and wear due to poor lubrication may easily occur within a short period of time.

Therefore, various measures for extending the retention time of the grease sealed inside the bearing have been suggested. For example, Japanese Patent Application Publication No. 2008-157441 JP-A-2008-157441) describes recessing the inner peripheral surface of an annular retainer 40 to form indentations 41 that serve as grease reservoirs, as shown in FIG. 3. There is a plurality of circular pockets 42 for retaining balls. Each of the indentations 41 is formed between the pockets 42 that are next to each other. In the retainer 40 described in JP-A-2008-157441, because the grease accumulates in the indentations 41 of the inner peripheral portion of the retainer 40, splash of the grease is prevented even if centrifugal force is high during high speed of rotation. Thus, the grease retention time is extended, and supply of the grease from the indentations 41 to ball surfaces lasts for a long period of time. As a result, it is possible to extend the operating service life of the bearing.

However, the indentations 41 of the retainer 40 described in JP-A-2008-157441 are recesses formed independently of the pockets 42 that accommodate the balls, that is, recesses formed so as not to be in communication with the pockets 42. Therefore, the grease is retained in the indentations 41 for a long period of time. However, there is a problem that it is difficult to smoothly supply the raceways with the oil content required for lubrication.

SUMMARY OF THE INVENTION

It is an object of the invention to provide a rolling bearing in which the oil content required for lubrication is smoothly supplied to raceways.

A first aspect of the invention relates to a rolling bearing. The rolling bearing includes: an inner ring; an outer ring that is arranged on an outer periphery of the inner ring via a plurality of rolling elements; a retainer that retains the plurality of rolling elements at regular intervals in a circumferential direction of the retainer; and a sealing member that is arranged in an annular space formed between the inner ring and the outer ring, and that seals a lubricant inside the rolling bearing. A first lubricant reservoir portion that stores the lubricant is formed on a radially inner side of the retainer. A second lubricant reservoir portion that stores the lubricant is formed on an inner side of the sealing member. A third lubricant reservoir portion that stores the lubricant is formed in an inner peripheral surface of the outer ring, at a position near a raceway on which the rolling elements roll. An inclined first guide surface that guides the lubricant from the second lubricant reservoir portion toward the raceway is formed in an inner surface of the sealing member, and an inclined second guide surface that is contiguous with the first guide surface and that guides the lubricant toward the raceway is formed in the inner peripheral surface of the outer ring. The first lubricant reservoir portion of the retainer is in communication with pockets of the retainer, which accommodate the rolling elements.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
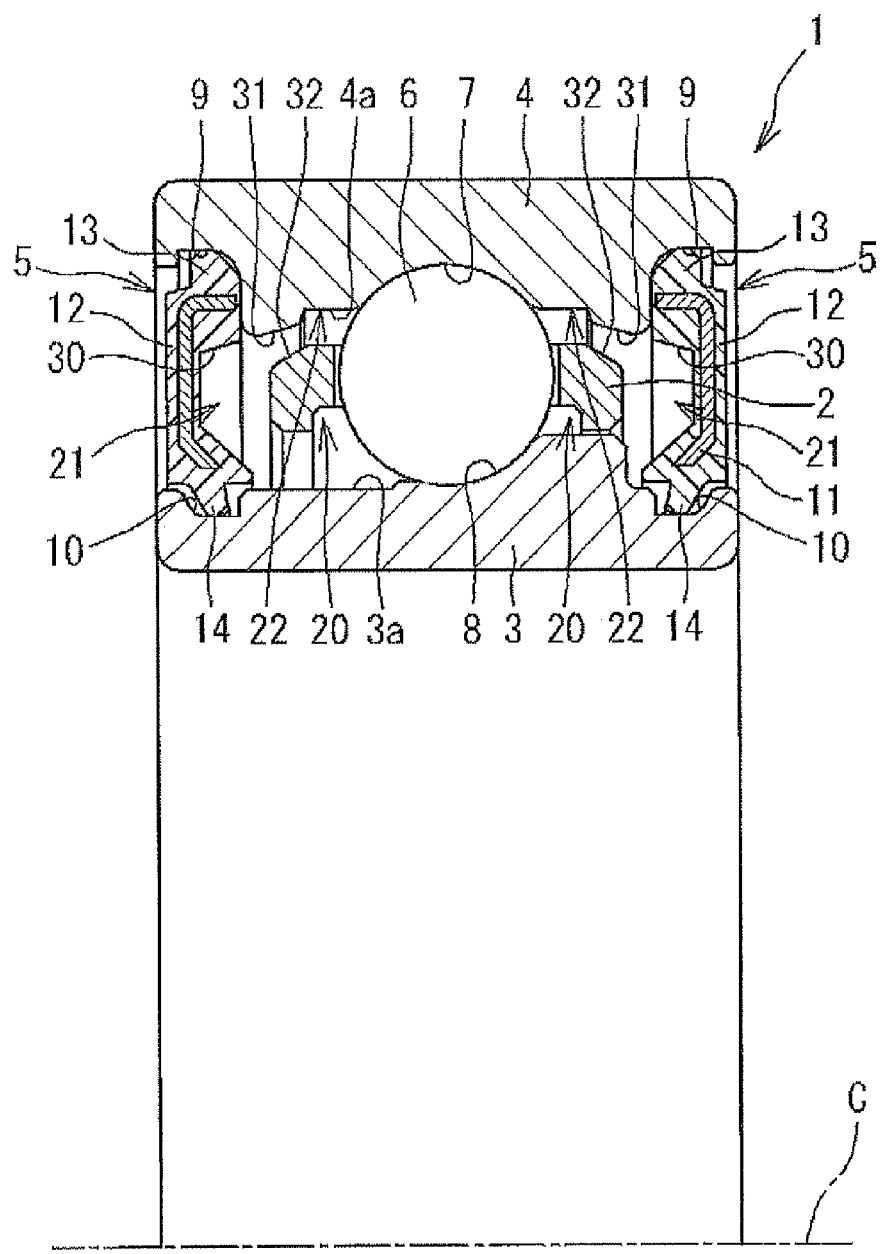
FIG. 1 is a sectional view of a rolling bearing according to an embodiment of the invention.
Figure 2:
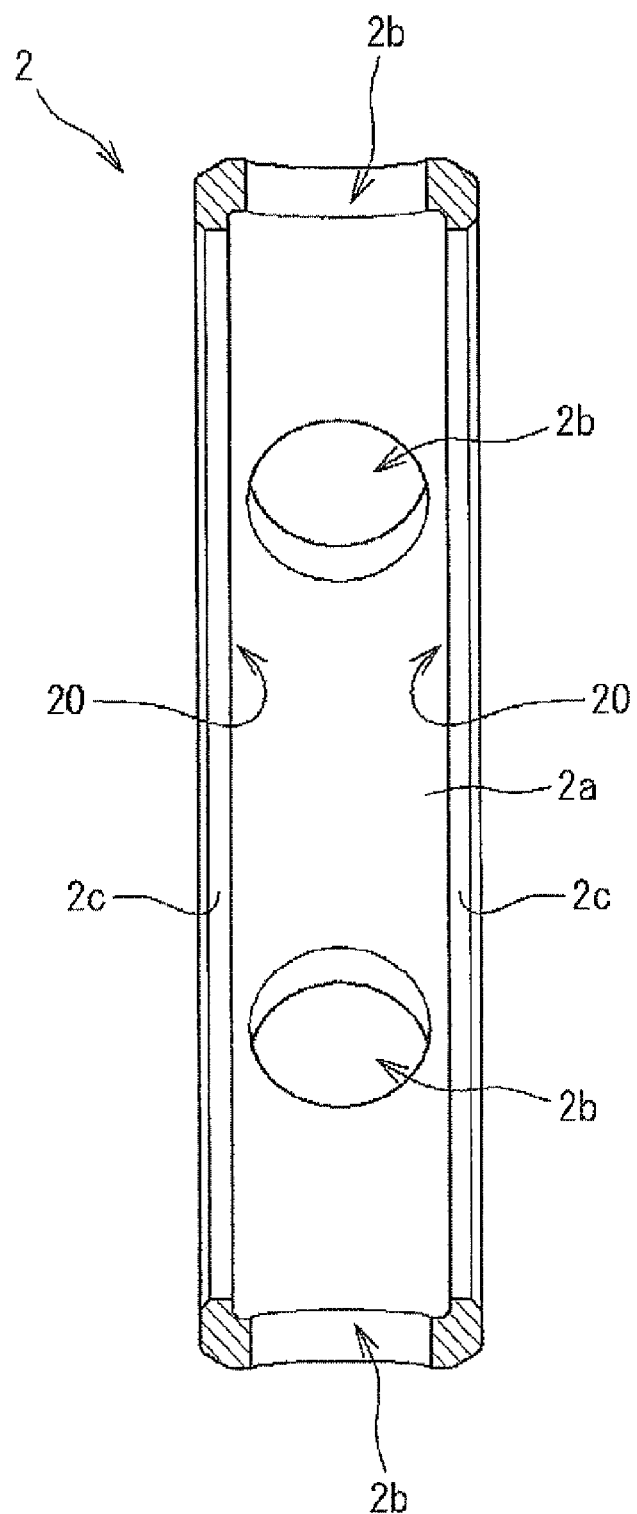
FIG. 2 is a sectional view of a retainer of the rolling bearing shown in FIG. 1.
Figure 3:
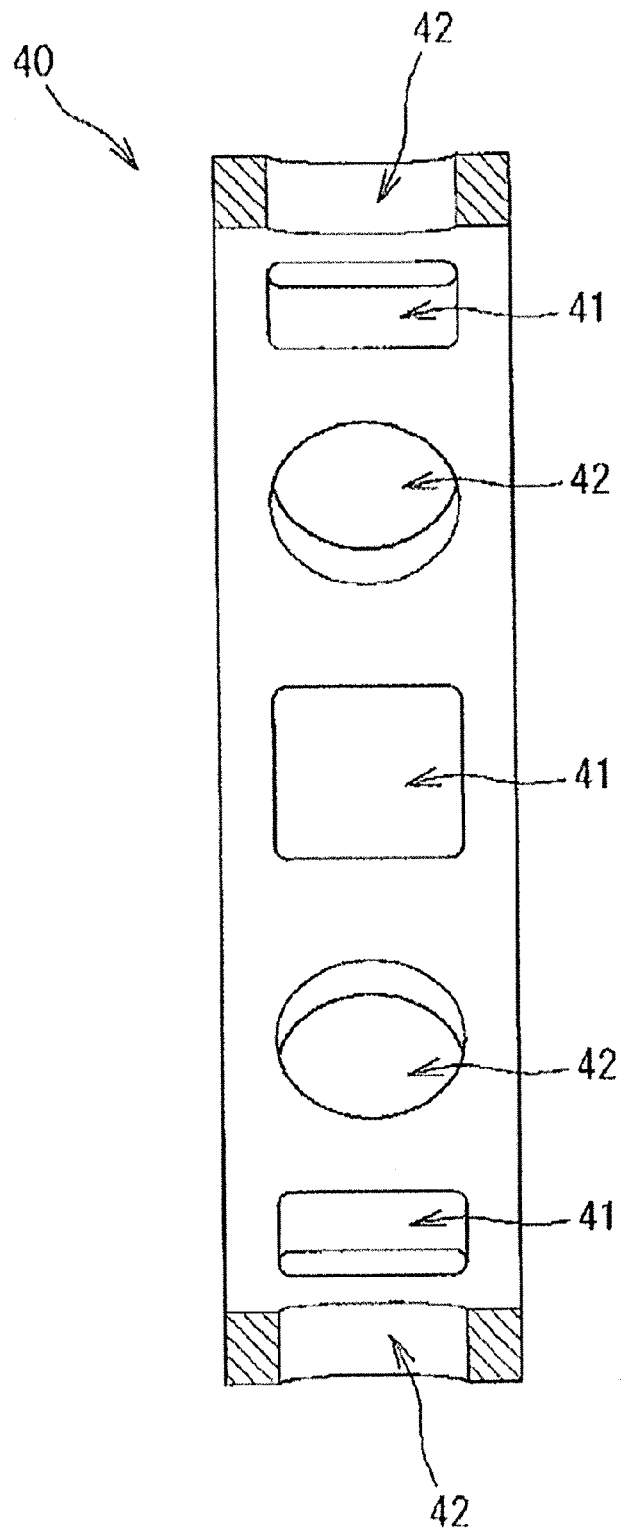
FIG. 3 is a sectional view of a retainer of a conventional rolling bearing.

Hereinafter, a rolling bearing according to an embodiment of the invention will be described in detail with reference to the accompanying drawings. FIG. 1 is a sectional view of a rolling bearing 1 according to the embodiment of the invention. FIG. 2 is a sectional view of a retainer 2 of the rolling bearing 1 shown in FIG. 1.

The rolling bearing 1 includes an inner ring 3, an outer ring 4, the retainer 2 and sealing members 5. The outer ring 4 is wronged on the outer periphery of the inner ring 3 via balls 6 that serve as a plurality of rolling elements. The outer ring 4 and the inner ring 3 are configured to rotate relative to each other about a rotation axis C. Raceways 7 and 8 are respectively formed by recessing an inner peripheral surface 4a of the outer ring 4, which faces the inner ring 3, and an outer peripheral surface 3a of the inner ring 3, which faces the outer ring 4. The plurality of balls 6 rolls on the raceways 7 and 8.

As shown in FIG. 2, the retainer 2 is formed of an annular body 2a, and the body 2a has circular pockets 2b for accommodating and retaining the balls 6. The circular pockets 2b are formed at predetermined intervals in the circumferential direction. Each pocket 2b radially passes through the body 2a of the retainer 2, and the inner periphery of each pocket 2b has a cylindrical shape. The retainer 2 is made of a base cloth impregnated with phenolic resin. The base cloth has oil impregnation property. An example of the base cloth is a cotton material. The retainer 2 is impregnated in advance with the base oil of grease that is used as a lubricant. Therefore, the retainer 2 is no longer impregnated with the base oil in the grease that is sealed inside the bearing, and therefore the base oil in the grease is effectively used to lubricate the raceways 7 and 8.

The sealing members 5 are used to prevent leakage of the grease sealed inside the bearing and prevent entry of foreign matter, such as water, from the outside into the inside of the bearing. The sealing members 5 are arranged in an annular space formed between the inner ring 3 and the outer ring 4. More specifically, inner peripheral seal grooves 9 are formed in respective axial end portions of the inner peripheral surface 4a of the outer ring 4, and outer peripheral seal grooves 10 are formed in respective axial end portions of the outer peripheral surface 3a of the inner ring 3. Each of the sealing members 5 is formed of a core metal 11 and an elastic body 12. The elastic body 12 is made of rubber and is baked to the periphery of the core metal 11 through a vulcanization process. A fixed portion 13 is formed at the outer peripheral side of the elastic body 12, and a seal lip 14 is formed at the inner peripheral side of the elastic body 12. The seal lip 14 slides on the surface of the outer peripheral seal groove 10. When the fixed portions 13 are fixed to the surfaces of the respective inner peripheral seal grooves 9 of the outer ring 3, the sealing members 5 are fixed to the outer ring 3.

First lubricant reservoir portions 20 that store the grease are formed on the radially inner side of the retainer 2. Specifically, protruding portions 2c are formed at respective axial ends (right and left ends in FIG. 1) of the inner peripheral surface of the body 2a of the retainer 2 so as to extend in the circumferential direction. The spaces on the inner side of the protruding portions 2c serve as the first lubricant reservoir portions 20. The first lubricant reservoir portions 20 are in communication with the pockets 2b of the retainer 2. That is, the first lubricant reservoir portions 20 are communicated with the pockets 2b of the retainer 2 smoothly without any barrier, such as a step and a protruding portion. The first lubricant reservoir portions 20 are formed on both sides of the pockets 2b (at both sides of the retainer 2 in the axial direction of the retainer 2).

Second lubricant reservoir portions 21 that store the grease are formed on the inner side of the respective sealing members 5. Furthermore, third lubricant reservoir portions 22 that store the grease are formed in the inner peripheral surface 4a of the outer ring 4, at positions near the raceway 7 on which the balls 6 roll. Each third lubricant reservoir portion 22 is formed in the inner peripheral surface 4a of the outer ring 4 so as to extend along the entire circumference of the inner surface 4a in the circumferential direction. The third lubricant reservoir portions 22 may be recesses that are formed in the inner peripheral surface 4a of the outer ring 4 at given intervals in the circumferential direction and that are able to be communicated with the raceway 7.

In the present embodiment, three types of lubricant reservoir portions, that is, the first lubricant reservoir portions 20, the second lubricant reservoir portions 21 and the third lubricant reservoir portions 22, are formed inside the bearing. The first lubricant reservoir portions 20 that are formed on the radially inner side of the retainer 2 are in communication with the pockets 2b of the retainer 2, which accommodate the balls 6. Therefore, the oil content in the grease is smoothly supplied to the raceways 7 and 8, which require lubrication, via the balls 6 accommodated in the pockets 2b. The third lubricant reservoir portions 22 are formed in the inner peripheral surface 4a of the outer ring 4, at positions near the raceway 7 on which the balls 6 roll. Therefore, the oil content in the grease is supplied also from the third lubricant reservoir portions 22 to contact portions at which the inner peripheral surface 4a of the outer ring 4 and the balls 6 contact each other.

In the present embodiment, the inner surfaces of the fixed portions 13 of the sealing members 5 each have an inclined first guide surface 30 that guides the grease from a corresponding one of the second lubricant reservoir portions 21 toward the raceway 7 of the outer ring 4. The inner peripheral surface 4a of the outer ring 4 has inclined second guide surfaces 31 that are smoothly contiguous with the first guide surfaces 30 without any step and that guide the grease to the raceway 7. The oil content in the grease stored in the second lubricant reservoir portions 21 is supplied to The raceway 7 of the outer ring 4 via the first guide surfaces 30 and the second guide surfaces 31. In this case, the first guide surfaces 30 and the second guide surfaces 31 are inclined radially outward toward the axial center of the bearing. Therefore, the oil content in the grease is smoothly supplied to the raceway 7.

Furthermore, in the present embodiment, inclined third guide surfaces 32 that guide the oil content in the grease toward the raceway 7 of the outer ring 4 are formed in the outer peripheral surface of the retainer 2. The third guide surfaces 32 smoothly guide the oil content in the grease to the raceway 7 of the outer ring 4 in cooperation with the second guide surfaces 31 of the outer ring 4.

Note that the invention is not limited to the embodiment described above, and may be implemented in various other modified embodiments. For example, in the above-described embodiment, a single-row ball bearing is illustrated as the rolling bearing. Alternatively, the rolling bearing may be a double-row ball bearing. In addition, the invention may also be applied to another rolling bearing, such as a roller bearing.

In addition, a known retainer or a known sealing member may be employed as needed.

In this way, with the rolling bearing according to the invention, it is possible to smoothly supply the raceways with oil content required for lubrication. Therefore, no vibrations, wear, and the like, due to poor lubrication occur, and the rolling bearing may be used in a high speed rotation range over a long period of time.

What is claimed is:

1. A rolling bearing, comprising:
an inner ring;
an outer ring that is arranged on an outer periphery of the inner ring via a plurality of rolling elements;
a retainer that retains the plurality of rolling elements at regular intervals in a circumferential direction of the retainer; and
a sealing member that is arranged in an annular space formed between the inner ring and the outer ring, and that seals a lubricant inside the rolling bearing,
wherein a first lubricant reservoir portion that stores the lubricant is formed on a radially inner side of the retainer,
wherein a second lubricant reservoir portion that stores the lubricant is formed on an inner side of the sealing member,
wherein a third lubricant reservoir portion that gores the lubricant is formed in an inner peripheral surface of the outer ring, at a position near a raceway on which the plurality of rolling elements roll,
wherein an inclined first guide surface that guides the lubricant from the second lubricant reservoir portion toward the raceway is formed in an inner surface of the sealing member, and an inclined second guide surface that is in-line with the first guide surface and that guides the lubricant toward the raceway is formed in the inner peripheral surface of the outer ring, and wherein the first lubricant reservoir portion of the retainer is in communication with pockets of the retainer, which accommodate the plurality of rolling elements.

2. The rolling bearing according to claim 1, wherein an inclined third guide surface that guides the lubricant toward the raceway in cooperation with the second guide surface of the outer ring is formed in an outer peripheral surface of the retainer.

3. The rolling bearing according to claim 1, wherein a protruding portion is formed at each of both axial ends of an inner peripheral surface of the retainer so as to extend in the circumferential direction of the retainer, and a space on an inner side of each protruding portion serves as the first lubricant reservoir portion.

4. The rolling bearing according to claim 3, wherein the retainer is made of a base cloth impregnated with phenolic resin, and the retainer is impregnated in advance with a base oil of grease that forms the lubricant.

5. The rolling bearing according to claim 4, wherein an inclined third guide surface that guides the lubricant toward the raceway in cooperation with the second guide surface of the outer ring is formed in an outer peripheral surface of the retainer.

6. The rolling bearing according to claim 4, wherein the base cloth has oil impregnation property.

7. The rolling bearing according to claim 6, wherein an inclined third guide surface that guides the lubricant toward the raceway in cooperation with the second guide surface of the outer ring is formed in an outer peripheral surface of the retainer.

8. The tolling bearing according to claim 3, wherein an inclined third guide surface that guides the lubricant toward the raceway in cooperation with the second guide surface of the outer ring is formed in an outer peripheral surface of the retainer.

9. The rolling bearing according to claim 1, wherein the retainer is made of a base cloth impregnated with phenolic resin, and the retainer is impregnated in advance with a base oil of grease that forms the lubricant.

10. The rolling bearing according to claim 9, wherein the base cloth has oil impregnation property.

11. The rolling bearing according to claim 10, wherein an inclined third guide surface that guides the lubricant toward the raceway in cooperation with the second guide surface of the outer ring is formed in an outer peripheral surface of the retainer.

12. The rolling bearing according to claim 9, wherein an inclined third guide surface that guides the lubricant toward the raceway in cooperation with the second guide surface of the outer ring is formed in an outer peripheral surface of the retainer.

* * * * *